United States Patent
Su et al.

(10) Patent No.: US 9,873,526 B2
(45) Date of Patent: Jan. 23, 2018

(54) LAUNCH TUBE RESTRAINT SYSTEM FOR UNMANNED AERIAL VEHICLE (UAV)

(71) Applicant: AeroVironment, Inc., Monrovia, CA (US)

(72) Inventors: Guan H Su, Rowland Heights, CA (US); Marcos Henry Rodriguez, Simi Valley, CA (US)

(73) Assignee: AEROVIRONMENT, INC., Monrovia, CA (US)

( * ) Notice: Subject to any disclaimer, the term of this patent is extended or adjusted under 35 U.S.C. 154(b) by 0 days.

(21) Appl. No.: 15/292,908

(22) Filed: Oct. 13, 2016

(65) Prior Publication Data
US 2017/0029135 A1 Feb. 2, 2017

Related U.S. Application Data

(63) Continuation of application No. 14/281,680, filed on May 19, 2014, now Pat. No. 9,470,477, which is a
(Continued)

(51) Int. Cl.
| | |
|---|---|
| B64F 1/04 | (2006.01) |
| B64C 39/02 | (2006.01) |
| B64F 1/06 | (2006.01) |
| F41F 3/042 | (2006.01) |
| F41F 3/052 | (2006.01) |
| F41F 3/073 | (2006.01) |

(Continued)

(52) U.S. Cl.
CPC .............. *B64F 1/04* (2013.01); *B64C 39/024* (2013.01); *B64F 1/06* (2013.01); *F41B 11/80* (2013.01); *F41F 3/00* (2013.01); *F41F 3/042* (2013.01); *F41F 3/052* (2013.01); *F41F 3/073* (2013.01); *B64C 2201/08* (2013.01); *B64C 2201/084* (2013.01); *B64C 2201/088* (2013.01); *B64C 2201/201* (2013.01)

(58) Field of Classification Search
USPC ................................. 244/63; 89/1.816, 1.817
See application file for complete search history.

(56) References Cited

U.S. PATENT DOCUMENTS

| | | | |
|---|---|---|---|
| D317,003 S | | 5/1991 | Tribe et al. |
| 5,261,554 A | * | 11/1993 | Forbes ................... A45C 11/20 220/592.16 |

(Continued)

FOREIGN PATENT DOCUMENTS

WO 2011066030 A2 6/2011

OTHER PUBLICATIONS

International Search Report for PCT Serial No. PCT/US12/67086 dated Aug. 19, 2013.

*Primary Examiner* — J. Woodrow Eldred
(74) *Attorney, Agent, or Firm* — Michael Zarrabian; Pejman Yedidsion; Eric Aagaard

(57) ABSTRACT

An unmanned aerial launch vehicle (UAV) launch apparatus is disclosed that includes a UAV (400) having an exterior surface, an aerial vehicle (AV) tab (510) extending from the exterior surface, a tube (440) containing the UAV (400), the tube (440) including a tab stop (515) configured to controllably hinder travel of the AV tab (510) past the tab stop (515), and a pair of opposing tab guides (700, 705) configured to position the AV tab (510) for travel over the tab stop (515).

23 Claims, 8 Drawing Sheets

Related U.S. Application Data continuation of application No. PCT/US2012/067086, filed on Nov. 29, 2012.

(60) Provisional application No. 61/564,792, filed on Nov. 29, 2011.

(51) Int. Cl.
*F41F 3/00* (2006.01)
*F41B 11/80* (2013.01)

(56) References Cited

U.S. PATENT DOCUMENTS

| | | |
|---|---|---|
| 5,322,243 A | 6/1994 | Stoy |
| 5,425,194 A * | 6/1995 | Miller .................... A01K 97/08 206/315.11 |
| D417,639 S | 12/1999 | Carichner et al. |
| D461,159 S | 8/2002 | Miralles et al. |
| 6,601,795 B1 | 8/2003 | Chen |
| 7,207,254 B2 * | 4/2007 | Veitch ....................... F41F 3/04 89/1.807 |
| 7,584,925 B2 | 9/2009 | Miller et al. |
| 7,793,606 B2 | 9/2010 | LaCour |
| 7,816,635 B2 | 10/2010 | Fink |
| 8,089,034 B2 | 1/2012 | Hammerquist |
| 9,187,184 B2 * | 11/2015 | Miralles ................ B64C 39/024 |
| 2007/0152098 A1 | 7/2007 | Sheahan et al. |
| 2010/0281745 A1 * | 11/2010 | Condon ................... F41F 3/04 42/90 |
| 2010/0282055 A1 * | 11/2010 | Jansson ................... F41F 3/077 89/1.817 |
| 2012/0205488 A1 | 8/2012 | Powell et al. |
| 2015/0008280 A1 | 1/2015 | Smoker |
| 2015/0053193 A1 | 2/2015 | Pruett et al. |

\* cited by examiner

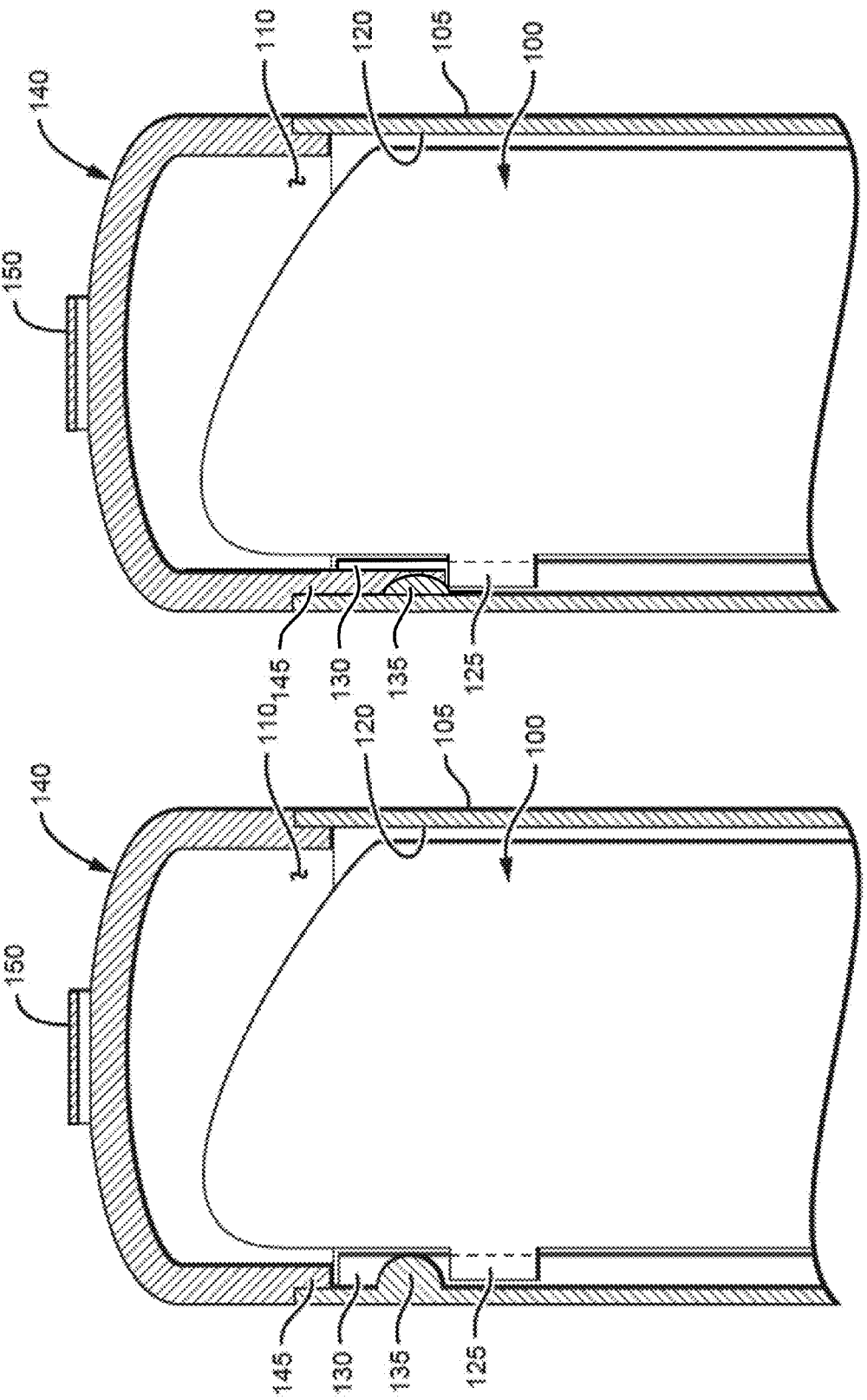

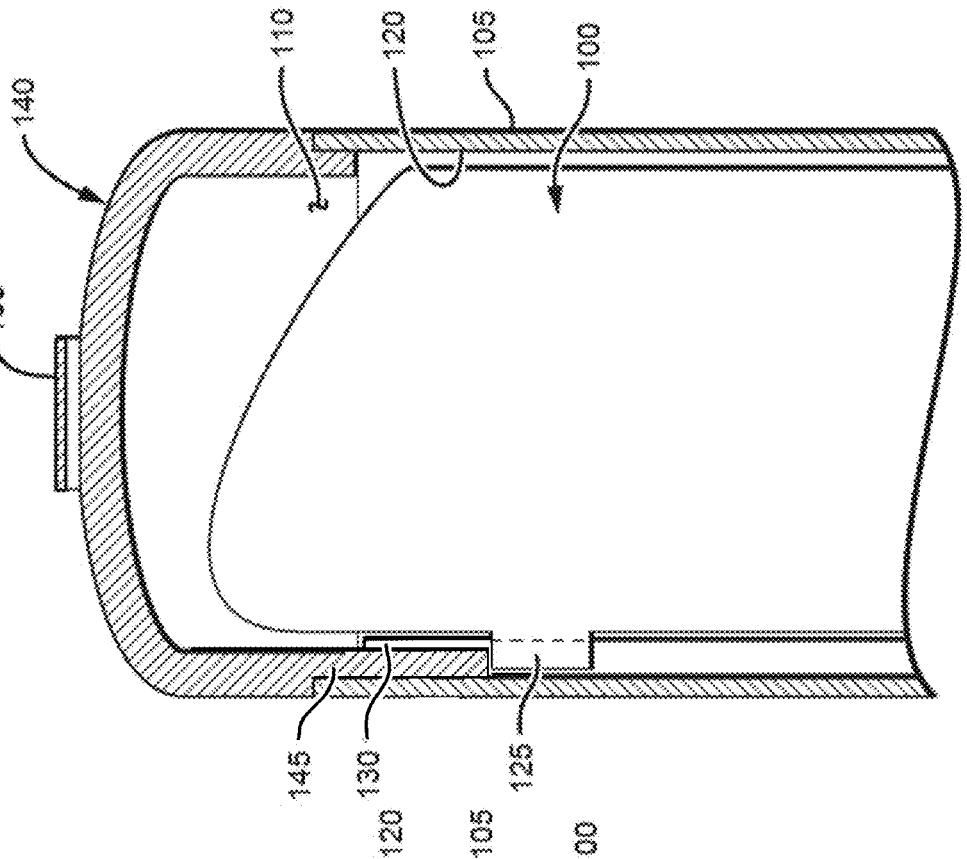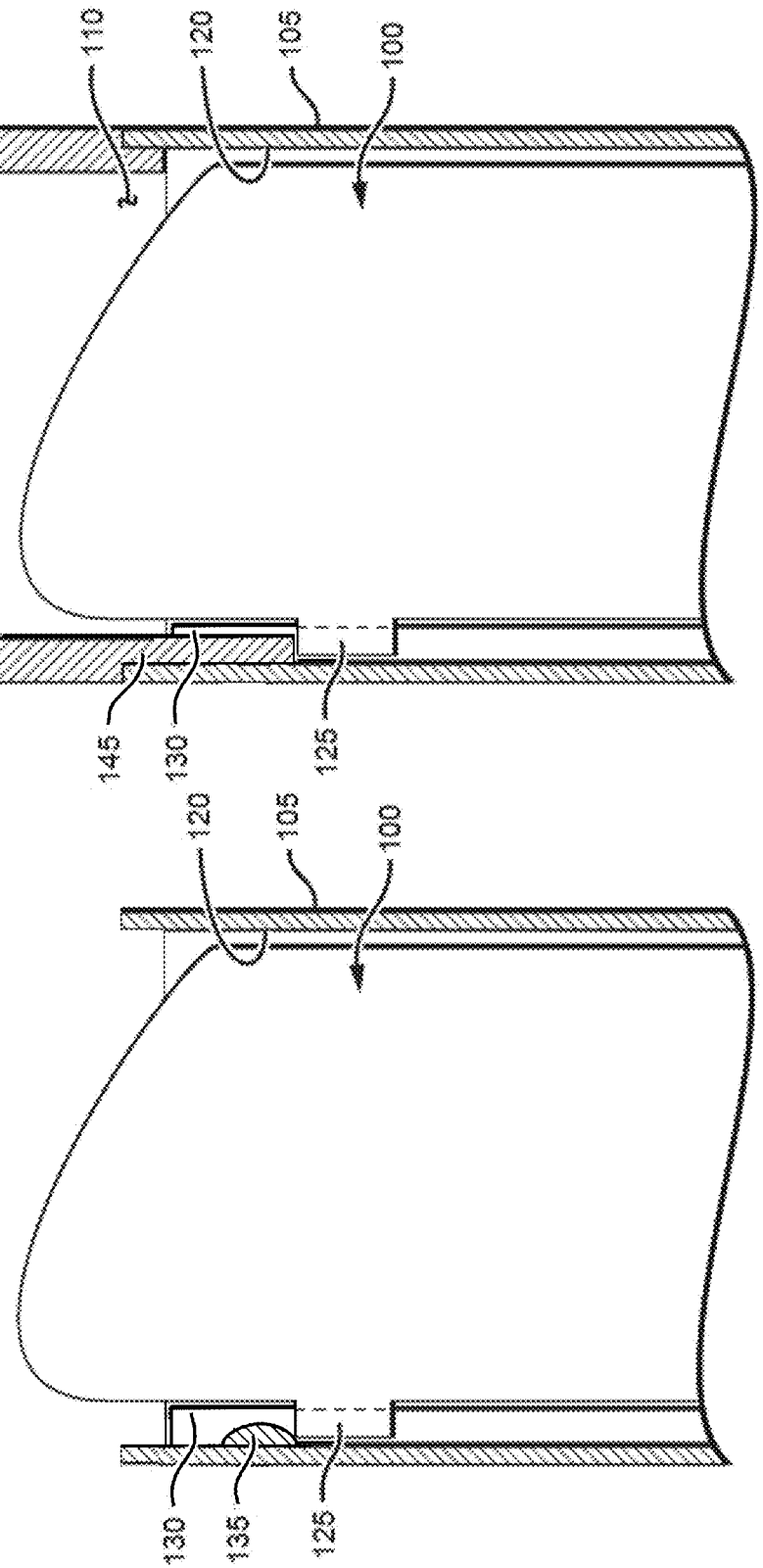

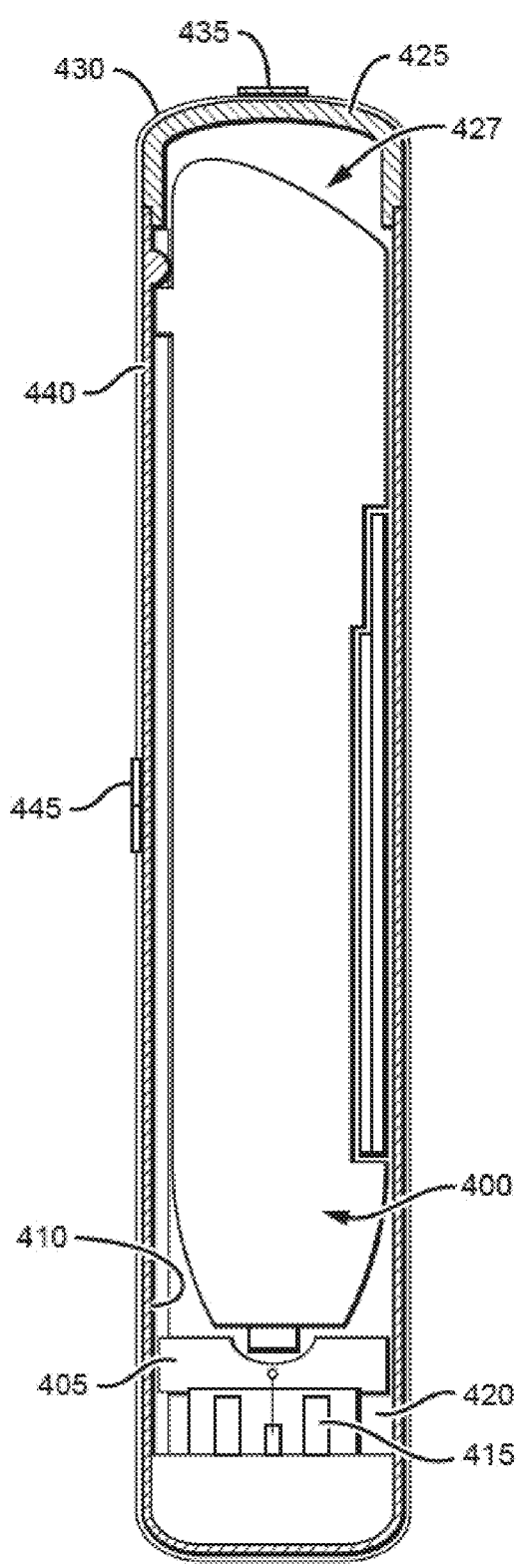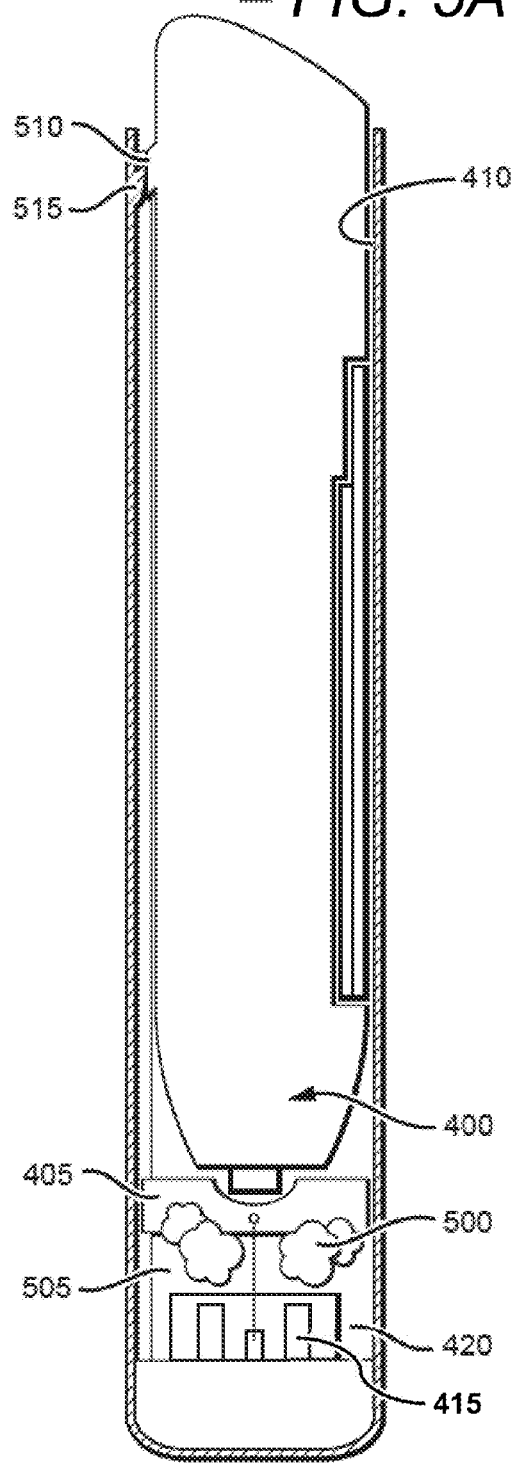

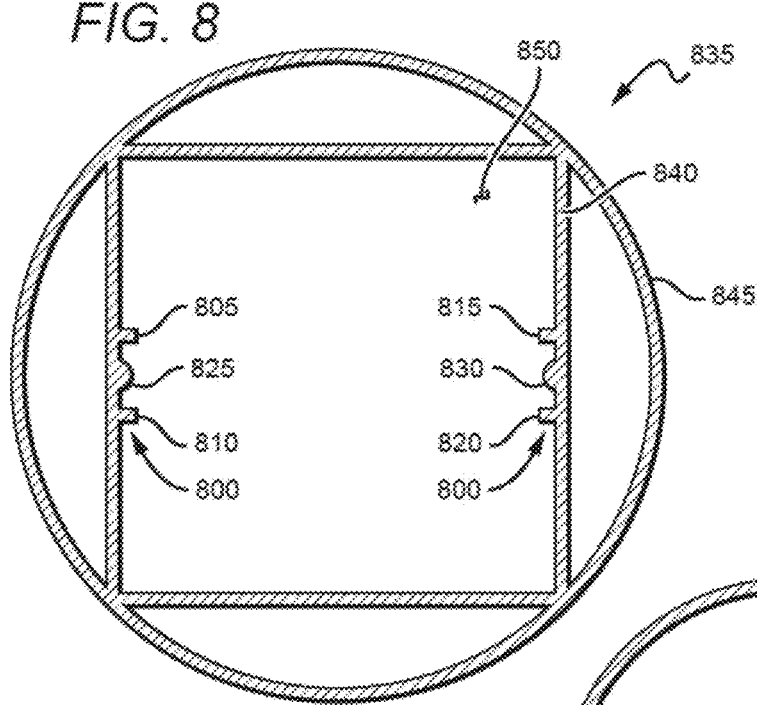
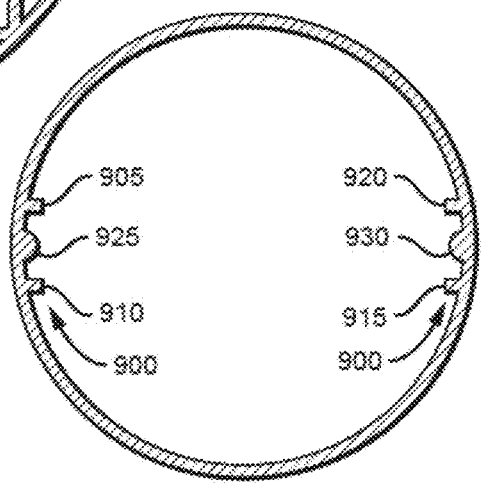
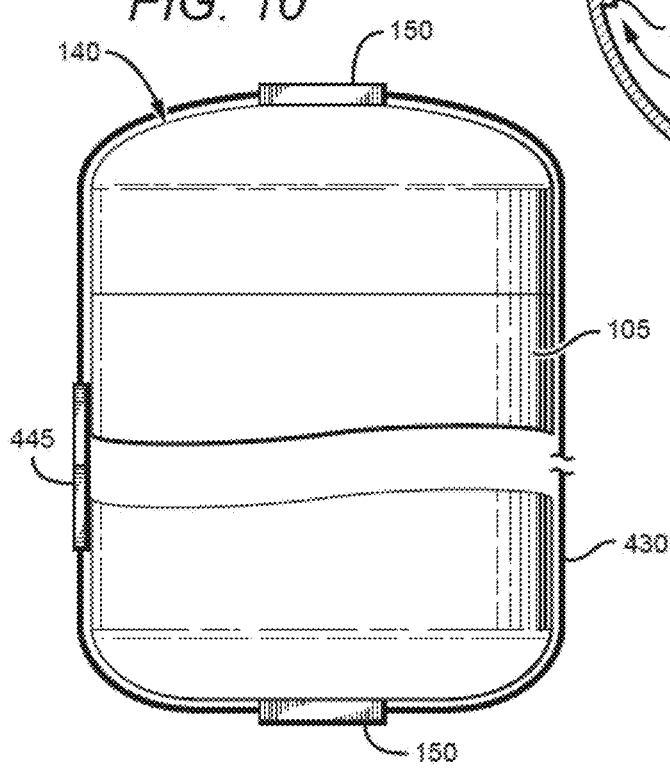

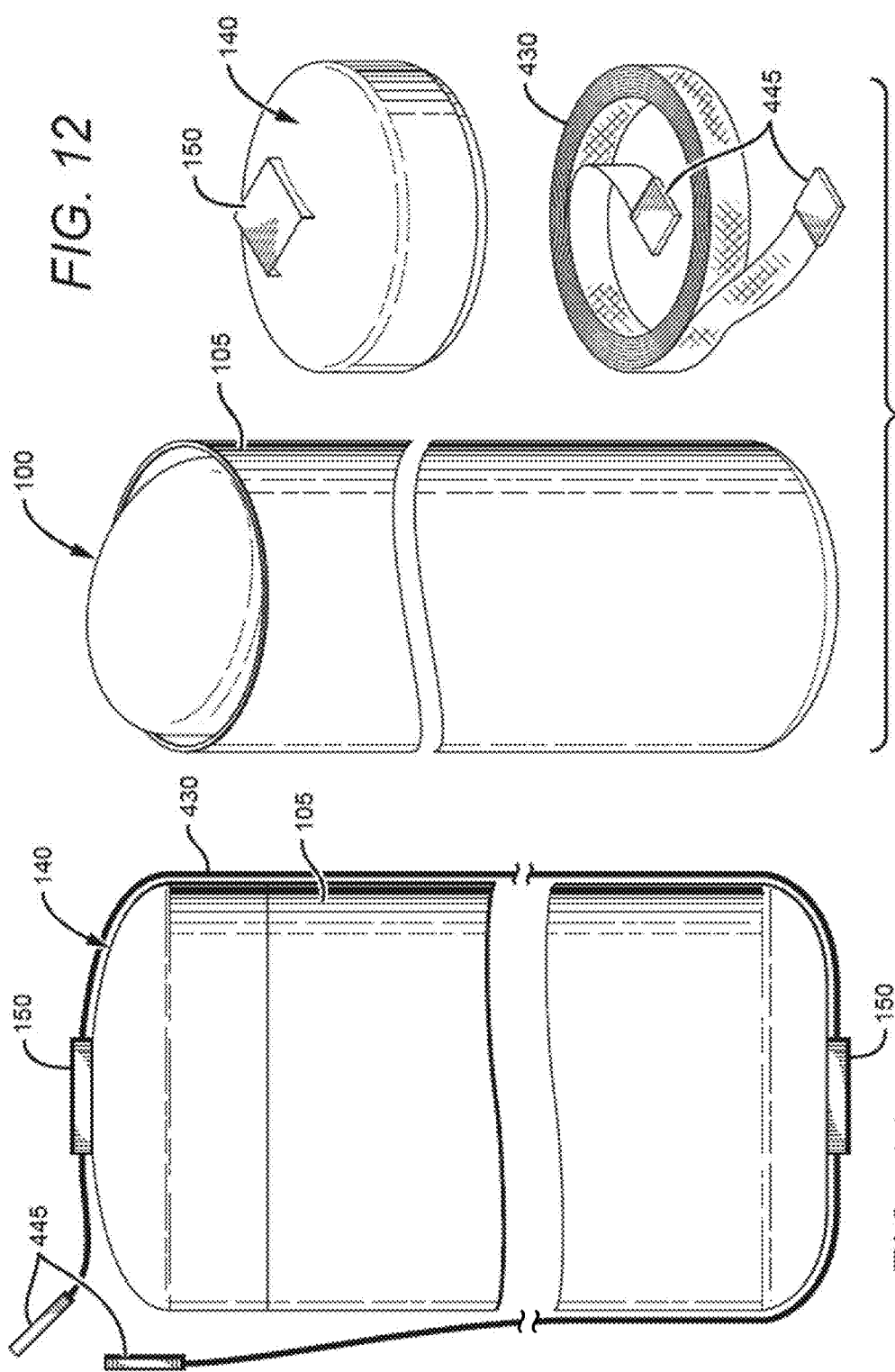

LAUNCH TUBE RESTRAINT SYSTEM FOR UNMANNED AERIAL VEHICLE (UAV)

CROSS REFERENCE TO RELATED APPLICATIONS

This application is a continuation of U.S. patent application Ser. No. 14/281,680, filed May 19, 2014, which is a continuation of International Patent Application No. PCT/US12/67086, filed Nov. 29, 2012, which claims priority to and the benefit of U.S. Provisional Patent Application Ser. No. 61/564,792 filed Nov. 29, 2011, both of which are hereby incorporated herein by reference in their entirety for all purposes.

BACKGROUND

Field of the Invention

This invention relates to launch tubes and canisters and report-suppressing launch tubes for an unmanned aerial vehicle (UAV).

Description of the Related Art

Typically UAVs are shipped to a launch site in an unassembled state. At the site they are assembled, tested, and launched. Launching is typically executed by hand, by an elastic tether, a powered wench, from a moving vehicle, or some combination thereof. Such methods can be time consuming and/or cumbersome. Once launched, a UAV may receive uplinks and may be guided by a human-in-the-loop, a human intermittently up-linking course corrections, e.g., via supervisory control, or by a preloaded intercept/strike point in combination with an onboard flight path guidance generator and outputs of inertial sensors and/or from a Global Positioning System (GPS) receiver.

SUMMARY

Embodiments of the invention include an unmanned aerial launch vehicle (UAV) launch apparatus, that may include a UAV having an exterior surface, an aerial vehicle (AV) tab extending from the exterior surface, and a tube containing the UAV, the tube comprising a tab stop configured to hinder travel of the AV tab about the tab stop and a tab guide configured to position the AV tab for travel about the tab stop. In one embodiment, the tube may include an open end and the tab stop may be disposed adjacent the open end. In other embodiments, the tab guide may include a trough formed in an inner circumferential wall of the tab guide may extend from an interior side of the tube. The tab guide may be configured to guide the AV tab axially along the tube, and the tab guide may include opposing parallel walls. The tab stop may include an end cap extending between the opposing parallel walls, and may include a tab stop that may be a prepeg material extension extending into an interior of the tube. In other embodiments, a cap may be positioned over the open end, the cap having a cap tab stop extending axially into the interior of the tube adjacent to the tab guide. Such an embodiment may also include a strap extending through the strap guide and restraining the cap. In other embodiments, a cap may be positioned over the open end, the cap having a strap guide configured to accept a strap. The embodiment may include a strap extending through the strap guide and restraining the cap.

Embodiments of an unmanned aerial launch vehicle (UAV) launch apparatus may also include a tube having an open end, and a pair of opposing tab guides extending axially along an interior of the tube, and at least one tab stop in at least one of the opposing tab guides. In such an embodiment, the at least one tab stop may be disposed adjacent the open end, and each of the pair of opposing tab guides may include opposing parallel walls. In one embodiment, the at least one tab stop may include a prepeg material extension extending into an interior of the tube. A cap may be positioned over the open end, the cap having a cap tab stop extending axially into the interior of the tube adjacent to the at least one tab guide. A cap may be positioned over the open end, the cap having a strap guide configured to accept a strap. A strap may extend through the strap guide and restrain the cap where the strap may be configured to forcibly restrain a UAV within the tube if the UAV is fired while the cap is on the tube.

A method of launching an unmanned aerial launch vehicle (UAV) includes axially restraining an aerial vehicle (AV) tab extending from the UAV using a tab stop so that the UAV is restrained in the launch tube, guiding the AV tab to abut the tab stop using a tab guide, and providing an axial launch force to the UAV, wherein the launch force is at least sufficient to enable elastic deformation of at least one of the AV tab and the tab stop to enable the AV tab to translate over the tab stop to enable the UAV to translate axially out of the launch tube. In one embodiment, the tab guide includes a trough in an inner circumferential wall of the launch tube. In other embodiments, the tab guide includes a pair of opposing walls extending from an inner circumferential wall of the launch tube. Embodiments of the method may include removing a cap from an open end of the launch tube, the cap having a cap stop extending into an interior of the launch tube and configured to engage the AV tab should the AV tab travel to the open end of the launch tube. The method may also include removing a strap from a strap guide of the cap, the strap coupled to an exterior of the launch tube.

BRIEF DESCRIPTION OF THE DRAWINGS

Embodiments are illustrated by way of example and not limitation in the figures of the accompanying drawings, and in which:

FIGS. 1A-1D depict exemplary embodiments of one end of a UAV launch tube, the UAV launch tube having a tab guide configured to guide an AV tab of a UAV axially along the tube for axial restraint by a tab stop;

FIGS. 4, 5A, 5B, and 6 depict an exemplary UAV launch with the tab guide guiding the AV tab to abut the tab stop and the gas generator providing sufficient launch force to enable elastic deformation of at least one of the AV tab and tab stop to enable the AV tab to translate over the tab stop and out of the launch tube;

FIG. 8 is a top cross-sectional view of one exemplary embodiment of a launch tube having inner and outer circumferential walls disposed about an aperture, with two tab guides and respective tab stops on opposing interior sides of the inner circumferential wall;

FIG. 9 is a top cross-sectional view of another exemplary embodiment of a launch tube tab; the tab having a single walled structure disposed about an aperture, with two tab guides and respective tab stops on opposing interior sides;

FIG. 10 depicts a broken-line side view to illustrate one embodiment of a strap extending through top and bottom tab guides and around a launch tube containing a UAV to prevent inadvertent forceful escape of the UAV;

FIG. 11 illustrates the system of FIG. 10, with two ends of the strap separated in preparation for removal of the cap from the launch tube to enable UAV launch; and FIG. 12 is a broken-line perspective view of the UAV in the launch tube, with the cap and strap removed from the launch tube in preparation for launch of the UAV.

DETAILED DESCRIPTION

Figure 2A:
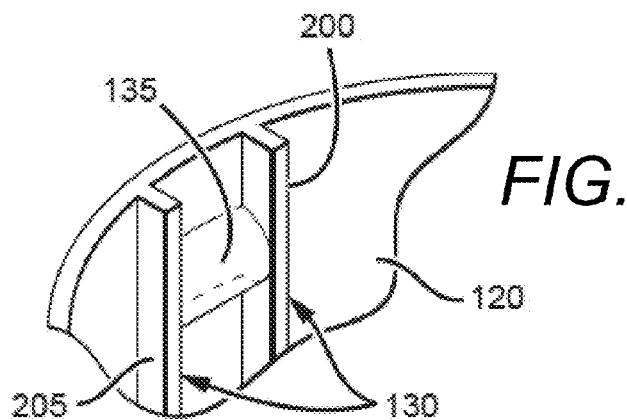
FIG. 2A is a perspective cut-away view of one exemplary embodiment of a UAV launch tube that includes a tab guide having opposing parallel walls and that includes a tab stop disposed between the pair of opposing parallel walls.

An unmanned aerial vehicle (UAV) launch apparatus is disclosed that includes a tube containing a UAV, the UAV having an aerial vehicle (AV) tab extending from its exterior surface, and a tab stop in the tube that is configured to controllably hinder travel of the AV tab past the tab stop, and a pair of opposing tab guides in the tube that are configured to position the AV tab for travel over the tab stop during operation. In this manner, the UAV is controllably restrained in the tube prior to launch due to interference between the UAV's AV tab and the tube's tab stop. However, during operation, the launch force is at least sufficient to enable elastic deformation of at least one of the AV tab and the tab stop to enable the AV tab to translate over the tab stop and to translate axially out of the launch tube. The UAV launch apparatus may also include a cap for positioning over the open end of the tube, the cap having a cap stop extending into an interior of the launch tube and configured to engage the AV tab should the AV tab travel to the open end of the launch tube. The cap may have a strap guide on its exterior surface to receive a strap to further constrain the UAV within the launch tube when not in operation.

In some embodiments, the tube's tab stop functions to retain the UAV, via the AV tab, within the tube when the UAV is urged forward by various forces that may be incurred during handling or maneuvering, e.g., an accidental dropping of the tube with the UAV inside. However, the tube's tab stop and the AV tab are configured to allow the UAV to exit the tube upon a user activated launch or other deployment. The cap, the cap stop and the strap, function to retain the UAV within the tube during transport and storage. The strap and cap are removed prior to, and to allow for, launch of the UAV from the tube.

FIGS. 1A-1D illustrate exemplary embodiments of a portion of UAV 100 that is axially restrained in a launch tube 105 for test and further transportation to a launch site. The launch tube 105 may have a single-walled structure disposed about an aperture 110 or may have inner circumferential walls 120 and outer circumferential walls. The UAV 100 is illustrated disposed in the aperture 110 adjacent an inner circumferential wall 120, with the UAV 100 having an AV tab 125 slideably guided by a tab guide 130. A tab stop 135 may extend between opposing parallel walls of the tab guide 130 (See FIG. 2) and outward from the inner circumferential wall 120 to hinder the AV tab 125 from sliding out of the aperture 110. The inner circumferential wall 120 may be formed of a prepeg substrate such as epoxy prepreg Kevlar™ The tab guide 130 may be formed by an extension of the prepeg substrate during formation of the inner circumferential wall 120 or may be a separate component that is coupled to the inner circumferential wall 120. A cap 140 may be seated on the tube 105 at its open end and may have a cap stop 145 extending axially into the interior of the tube 105 adjacent to the tab guide 130. In some embodiments, the cap stop 145 may extend into the tab guide 130 so as to be adjacent to the AV tab 125 when the cap 140 is engaged to the tube 105 (FIGS. 1B and 1D). Accordingly, with the cap 140 engaged to the tube 105, the AV tab 125 may be further constrained in its movement. However, once the cap 140 is removed from the tube 105 (FIG. 1C), the AV tab 125 may pass over the tab stop 135 during a launch, or the deployment, of the UAV 100. In the embodiments of FIGS. 1B and 1C, with the cap, or the cap 140 and strap (see FIG. 12), in position the UAV 100 will be retained at or about its position within the tube during actions that would tend to urge it out of position, e.g., actions such as being handled, maneuvered, dropped, and even accidentally or prematurely being launched—due to an operation of the tube's gas generators. With the cap 140 and strap removed these embodiments allow the UAV 100 to continue to be retained in the tube for actions that would tend to urge it out of position, e.g., actions such as being handled, maneuvered or dropped, but would allow the UAV 100 to exit the tube upon a launch. In other embodiments, the cap stop 145 may extend further into the launch tube 105 so as to be adjacent to the AV tab 125 when the cap 140 is engaged to the tube 105 (FIG. 1D). In the embodiment of FIG. 1D, the cap stop 145 may act as the sole stop to retain the AV tab 125 in place while the cap 140 is engaged. The cap 140 may have a strap guide 150 configured to accept a strap (See FIG. 12) that restrains the cap 140 onto the tube 105.

FIG. 2A is a perspective cut-away view illustrating the tab guide 130 and tab stop 135 first illustrated in FIG. 1. The tab guide 130 may be in the form of opposing parallel walls (200, 205) that extend from the inner circumferential wall 120. Although illustrated as rectangular in cross section, the opposing parallel walls may be formed during formation of the epoxy prepreg inner circumferential wall 120 and so may define different cross-sections, such as a semi-circular cross section. In one embodiment, the tab guide 130 may be formed as a trough in the inner circumferential wall 120 or as a single rail to axially guide a suitable AV tab (not shown). The tab stop 135 may also be formed during formation of the epoxy prepreg inner circumferential wall 120 and may extend away from the inner circumferential wall 120 between the opposing parallel walls (200, 205). In the embodiment that is a trough formed in the inner circumferential wall 120, the tab stop 135 may extend up through a base of the tab guide to a level that is defined by the remainder of the inner circumferential wall 120 so as to avoid impinging into the aperture 110. The tab stop 135 may vary in size and height in the channel defined by the walls 200 and 205, depending on the specific requirements for retention prior to launch and allowing for the launch.

Figure 2B:
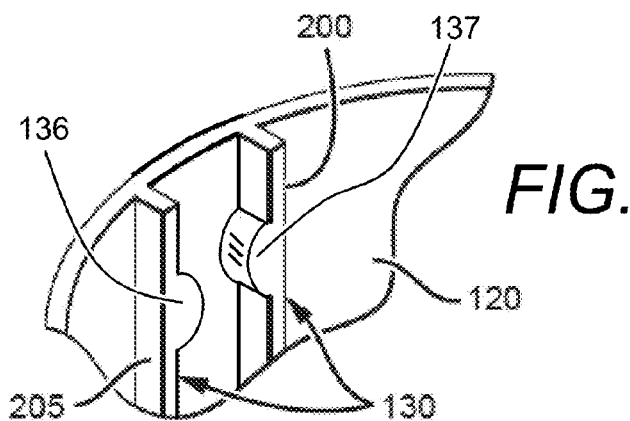
FIG. 2B is a perspective cut-away view of one exemplary embodiment of a UAV launch tube that includes a tab guide having opposing parallel walls and that includes one or more tab stops disposed on the opposing parallel walls.

FIG. 2B is a perspective cut-away view illustrating the tab guide 130 and an exemplary embodiment having one or more tab stops (136, 137). In one embodiment, the tab stops (136,137) may be disposed on the opposing parallel walls of the tab guide 130 and extend inwards toward each other, such that an AV tab (See FIGS. 1A-1D) may pass through the channel created by the tab guide 130 and between the one or more tab stops (136,137).

Figure 3:
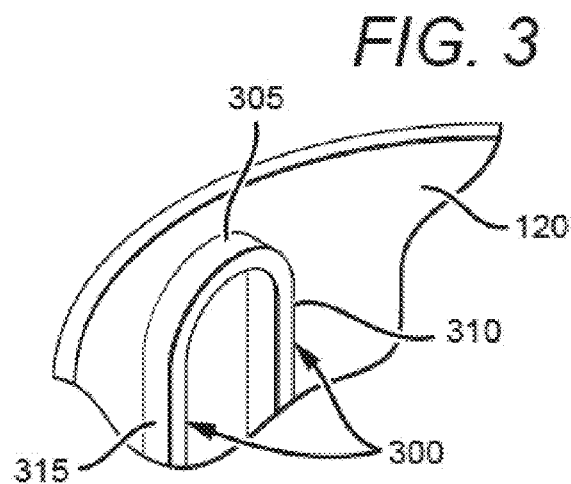
FIG. 3 is a perspective cut-away view of another embodiment of a UAV launch tube that includes a tab guide having opposing parallel walls and a tab stop forming an end cap for the opposing walls.

FIG. 3 is a perspective cut-away view of a tab guide that incorporates, in one embodiment, a tab stop. The tab guide 300 may continue to extend between the opposing parallel walls (310, 315) to establish a tab stop 305 that is an end cap. In an alternative embodiment, a tab guide may include a trough (not shown) in the inner circumferential wall 120, with the tab stop represented by an end of the trough so that an AV tab axially guided by the trough is hindered from further axial progress through the aperture by the end of the trough. In either of the embodiments illustrated in FIGS. 2 and 3, the tab guide may be configured to guide an AV tab to abut the tab stop and may position the AV tab for travel over the tab stop. The tab stop may be configured to controllably hinder travel of the AV tab past the tab stop. For example, during operation such as when an axial launch force is applied to the UAV, the launch force may be at least sufficient to enable elastic deformation of at least one of the AV tab and the tab stop to enable the AV tab to translate over the tab stop to enable the UAV to translate axially out of the launch tube.

FIGS. 4, 5A, 5B, and 6 illustrate one embodiment of a UAV launch tube and UAV 400 during operation, with a tab guide in the tube guiding an AV tab 510 on the UAV 400 to abut the tab stop 515, and the gas generator 415 providing sufficient launch force to enable elastic deformation of at least one of the AV tab 510 and tab stop 515 to enable the AV tab 510 to translate over the tab stop 515 and out of the launch tube. A UAV 400 may be seated on a launch sabot 405, with the launch sabot 405 substantially forming a gas seal with an inner circumferential wall 410 when a gas generator 415 pressurizes a high-pressure volume 420. A cap 425 is seated on an open end 427 of the UAV launch tube to prevent ejection of the UAV during transport. A strap 430 may be guided by a strap guide 435 around the cap 425 to hold it in place on the launch tube 440. A strap buckle 445 may detachably attach both ends of the strap 430.

Figure 5B:
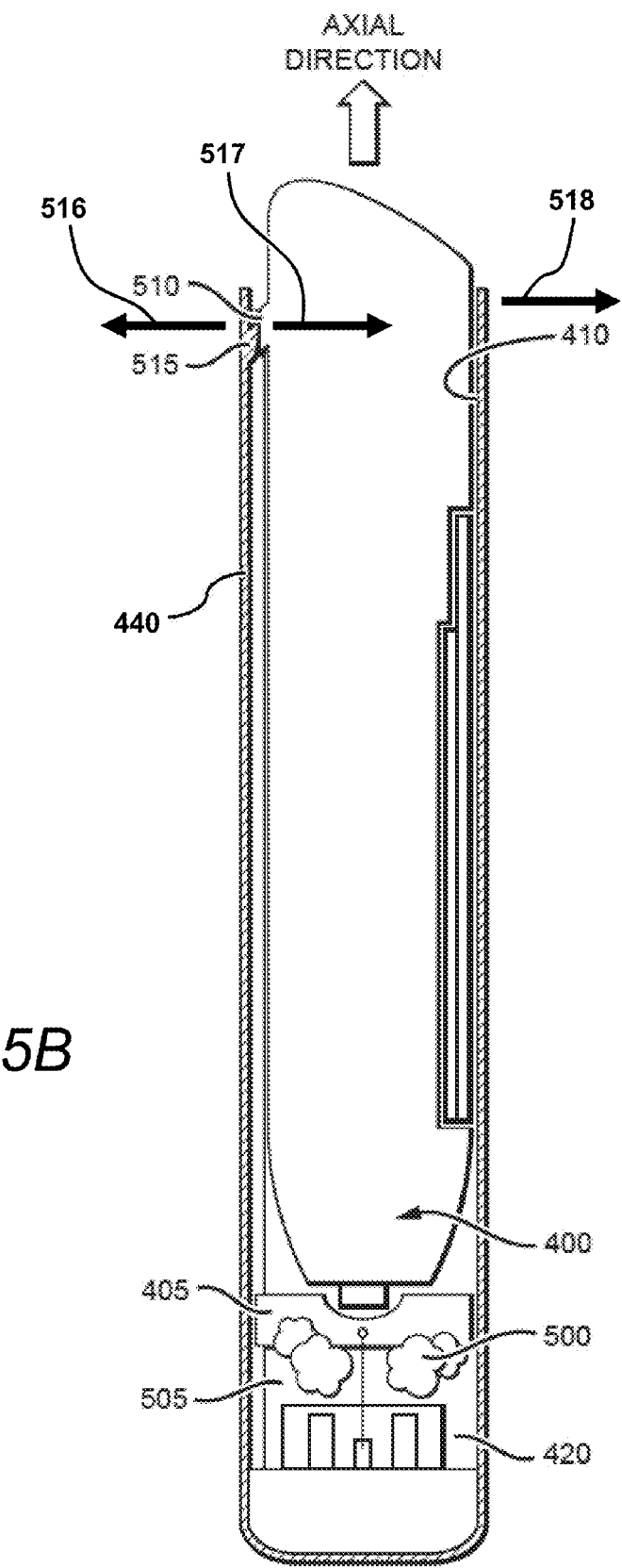
Figure 6:
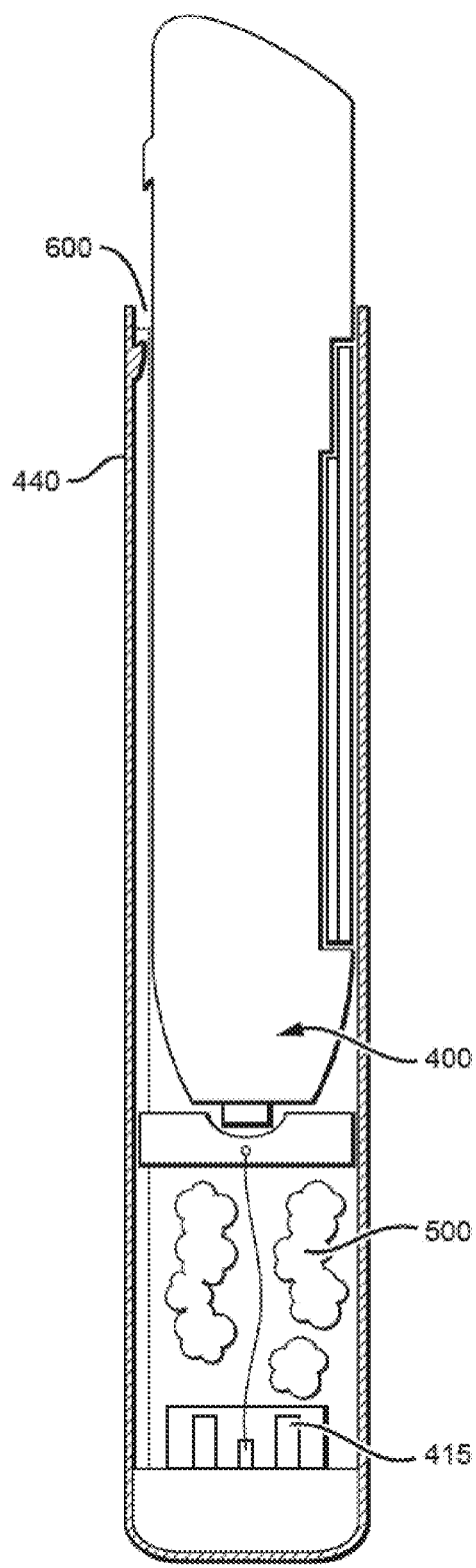

In FIG. 5A, the gas generator 415 is depicted as generating gas 500 to pressurize the high-pressure volume 420—resulting in differential pressure against the launch sabot 405 between the high-pressure volume 420 and the remainder of the launch tube 505. The sabot 405 may thus drive an AV tab 510 jutting from the UAV 400 forceably over a tab stop 515 that may extend from the inner circumferential wall 410. The launch force may cause elastic deformation of at least one of the AV tab 510 and the tab stop 515 to enable the AV tab 510 to translate over the tab stop 515 to enable the UAV 400 to translate axially out of the launch tube 440. In FIG. 5B, the AV tab 510 and the tab stop 515 may pass by each other during the launch of the UAV 400. This movement may cause a deflection of the tube 440, as illustrated by the arrows (516, 518). Additionally, in some embodiments, the movement of the UAV 400 relative to the tube 440 may cause both deflection of the tube 440, as illustrated by the arrows (516, 518), as well as deformation of the tab stop 515 and/or deformation of the AV tab 510, as illustrated by the arrow 517. In some embodiments, the UAV 400 launch may cause the tube 440 to expand outward on both sides, as illustrated by the two outward facing arrows (516, 518). In other embodiments, the UAV 400 itself may deform to move past a more rigid tube 440 and tab stop 515, as illustrated by the arrow 517. In FIG. 6, the gas generator 415 continues to generate gas 500 to propel the UAV 400 out of the launch tube 440 and through an aperture 600.

Figure 7:
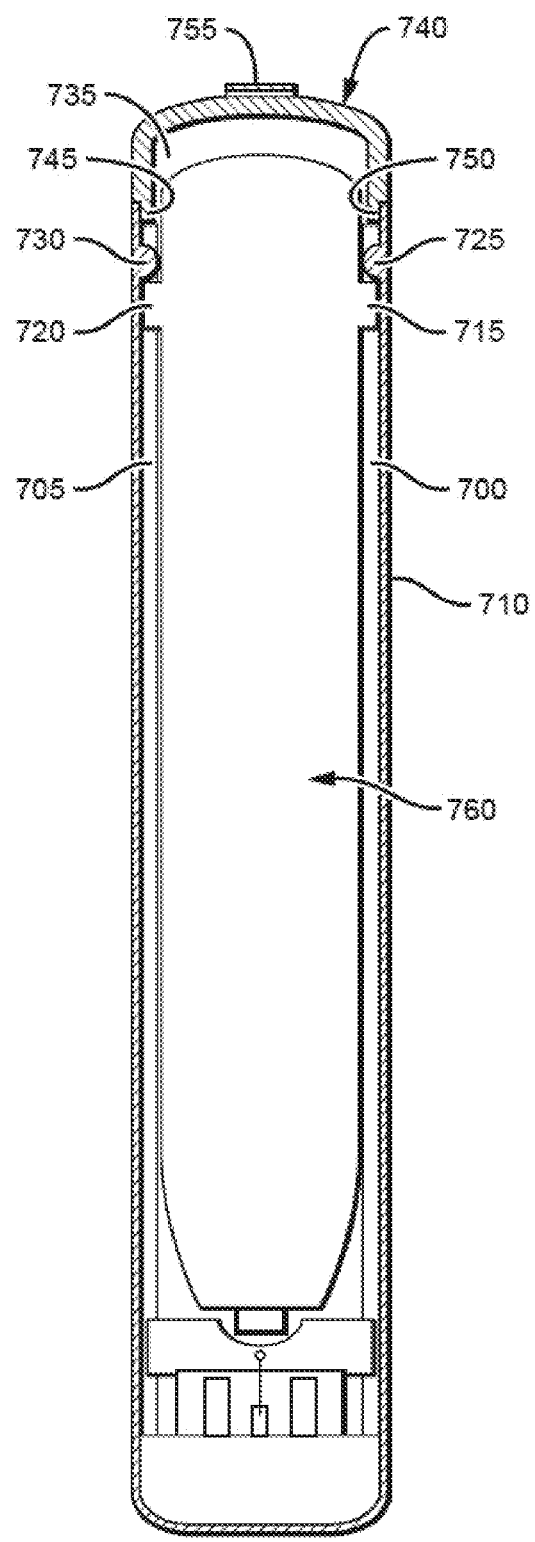
FIG. 7 depicts an exemplary embodiment of a UAV launch tube that includes two tab guides to controllably hinder travel of respective AV tabs past, or about, their respective tab stops.

FIG. 7 illustrates a UAV launch tube that includes, in one embodiment, two tab guides on opposite interior sides of the launch tube to controllably hinder travel of respective AV tabs past respective tab stops. Opposing tab guides (700, 705) extend axially along an interior of a launch tube 710 and may be configured to guide respective AV tabs (715, 720) to abut respective tab stops (725, 730). Each of the tab stops (725, 730) may be disposed adjacent an open end 735 of the launch tube 710. A cap 740 is positioned over the open end 735, the cap having cap stops (745, 750) extending axially into the interior of the tube 710 adjacent the tab guides (700, 705) to engage the AV tabs (715, 720) should the AV tabs (715, 720) travel to the open end of the launch tube. The cap 740 may have a cap guide 755 configured to accept a strap (not shown) to center the strap along a center section of the cap 740 to provide more effective restraint of the cap 740 onto the tube 710. In preparation for launch of the UAV 760, the strap may be removed from the cap guide 755 of the cap 740, the strap detachably coupled to an exterior of the launch tube 710, and the cap 740 may be removed from the open end 735 of the launch tube 710.

FIG. 8 is a top cross-sectional view of one exemplary embodiment of a launch tube 835 that has a tab guide 800 on each of two opposing sides of an inner circumferential wall 840 disposed about an aperture 850. In one embodiment, each tab guide 800 includes a pair of opposing parallel walls (805, 810) (815, 820) configured to position an AV tab (not shown) for travel over respective tab stops (825, 830). The tube 835 has inner and outer circumferential walls (840, 845) disposed about an aperture 850, with each tab guide 800 extending from the inner circumferential wall 840. Each of the inner and outer circumferential walls (840, 845) may be formed of a prepeg substrate such as epoxy prepreg Kevlar™ The tab guides 800 and tab stops (825, 830) may be formed by an extension of the prepeg substrate during formation of the inner circumferential wall 840 or may be a separate component that is coupled to the inner circumferential wall 840.

FIG. 9 is a top cross-sectional view of another exemplary embodiment of a launch tube tab having a single-walled structure disposed about an aperture, with two tab guides and respective tab stops on opposing interior sides. In the embodiment depicted, each tab guide 900 may include a pair of opposing parallel walls (905, 910) (915, 920); the walls configured to position an AV tab (not shown) for travel over respective tab stops (925, 930).

FIG. 10 illustrates one embodiment of a safety strap 430 that extends around the cap 140 and UAV launch tube 105 to prevent inadvertent and accidental forceful escape of the UAV from the launch tube. The strap 430 preferably extends over a top of the cap 140 and through the strap guide 150 to secure the cap in place on the launch tube 105. In one embodiment, the strap 430 extends down around an exterior of the launch tube 105 to a bottom strap guide 150 that may be the same type as the top strap guide 150. The strap may then have both its ends detachably coupled, such as by buckles 445 or other attachment. The strap 430 and buckle 445 may be designed with sufficient strength to prevent inadvertent forceful escape of the UAV through the aperture, such as if the gas generator 415 (see FIGS. 4, 5A, and 6) prematurely triggers with the cap 140 still on the launch tube 105. In such an accident, or other incidents, the launch tube cap is restrained and the UAV remains in the launch tube by means of the strap 430 holding the cap 140 securely in place on the launch tube 105.

FIGS. 11 and 12 illustrate preparation of the launch tube assembly for launch of the UAV 100. The buckles 445 are decoupled from one another and the cap 140 may be removed from the launch tube 105. In one embodiment, the strap 430 and its buckles 445 may be removed from the strap guide 150 and set aside. The cap 140 may then be entirely disconnected from the launch tube 105 and set aside to facilitate stable launch of the UAV 100. In another embodiment, the strap 430 may remain detachably and guidably connected to either the upper or lower strap guides 150, or both, and so the cap 140 is still connected to the launch tube 105 and yet out of the travel path of the UAV 100 for its launch. In other embodiments, the strap guide 150 may not require a top portion in order to hold the strap 430 in place (not shown). Two guides may be utilized on either side of the strap 430 at the top and bottom to facilitate removal of the strap 430 and the cap 140.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. An unmanned aerial launch vehicle (UAV) launch apparatus, comprising:
   a UAV;
   a tube containing the UAV, wherein the tube has an open end;
   a cap positioned over the open end of the tube; and
   a strap extending through at least one strap guide and restraining the cap;
   wherein the strap extends around the entire tube.

2. The apparatus of claim 1, wherein the strap extends over a top of the cap.

3. The apparatus of claim 1, wherein the strap extends through at least one strap guide.

4. The apparatus of claim 3, wherein the at least one strap guide includes at least one of: a top strap guide disposed on the cap and a bottom strap guide disposed distal from the open end of the tube.

5. The apparatus of claim 1, wherein the strap has a first attachment at a first end of the strap and a second attachment at a second end of the strap, and wherein the first attachment is detachably coupled to the second attachment.

6. The apparatus of claim 5, wherein the first attachment and the second attachment are buckles.

7. The apparatus of claim 5, wherein the strap, first attachment, and second attachment have sufficient strength to prevent forceful escape of the UAV through the open end of the tube by holding the cap in place over the open end of the tube.

8. The apparatus of claim 1, wherein the strap remains connected to the at least one strap guide when the cap is removed from the open end of the tube.

9. The apparatus of claim 8, wherein the cap remains connected to the tube via the strap when the cap is removed from the open end of the tube.

10. The apparatus of claim 1, wherein the at least one strap guide includes two guides disposed on either side of the strap.

11. The apparatus of claim 10, wherein the at least one strap guide includes a top portion disposed between the two guides to hold the strap in place.

12. An apparatus, comprising:
    a tube having an open end;
    a cap positioned over the open end of the tube; and
    a strap extending through a top strap guide and restraining the cap, wherein the cap and strap have sufficient strength to forcibly retain an unmanned aerial vehicle (UAV) within the tube upon application of a launch force;
    wherein the strap extends around the entire tube.

13. The apparatus of claim 12, further comprising:
    a bottom strap guide disposed distal from the open end of the tube, wherein the strap extends through the bottom strap guide.

14. The apparatus of claim 12, wherein the strap has a first attachment at a first end of the strap and a second attachment at a second end of the strap, and wherein the first attachment is detachably coupled to the second attachment.

15. The apparatus of claim 12, wherein the cap comprises a top strap guide.

16. The apparatus of claim 15, wherein the strap remains connected to the top strap guide when the cap is removed from the open end of the tube.

17. The apparatus of claim 16, wherein the cap remains connected to the tube via the strap when the cap is removed from the open end of the tube.

18. The apparatus of claim 15, wherein the top strap guide includes two guides disposed on either side of the strap.

19. The apparatus of claim 16, wherein the top strap guide includes a top portion disposed between the two guides to hold the strap in place.

20. A method of launching an unmanned aerial launch vehicle (UAV), comprising:
    removing a strap detachably coupled to an exterior of a tube, wherein the strap extends around the entire tube;
    removing the cap from an open end of the tube; and
    providing an axial launch force to the UAV, wherein the launch force is at least sufficient to enable the UAV to translate axially out of the tube.

21. The method of claim 20, wherein removing the strap further comprises:
    decoupling a first attachment at a first end of the strap from a second attachment at a second end of the strap.

22. The method of claim 20, further comprising:
    removing the strap from a bottom strap guide disposed distal from the open end of the tube.

23. The method of claim 22, wherein the strap extends through a top strap guide of a cap.

* * * * *